United States Patent [19]

Ochsenbein et al.

[11] Patent Number: 5,571,541

[45] Date of Patent: Nov. 5, 1996

[54] DEVICE FOR RECONDITIONING TUBES, PARTICULARLY CARDBOARD TUBES

[75] Inventors: Charles Ochsenbein, Rixheim; Yves Roesch, Munchhouse, both of France

[73] Assignee: Pack'Industrie S.A., Rixheim, France

[21] Appl. No.: 349,804

[22] Filed: Dec. 6, 1994

[30] Foreign Application Priority Data

Dec. 7, 1993 [FR] France .................................. 93 14953

[51] Int. Cl.⁶ .......................... B28B 21/42; B28B 21/98; B28B 21/96
[52] U.S. Cl. .............................. 425/393; 72/111; 264/312
[58] Field of Search .............................. 425/392, 393, 425/343; 72/110, 111; 264/312, 296

[56] References Cited

U.S. PATENT DOCUMENTS 4,324,755  4/1982  Bommer ............................... 425/392
4,608,846  9/1986  Rathbun .................................. 72/111

FOREIGN PATENT DOCUMENTS 645966   11/1928  France .
2369911   6/1978  France .
2466287   4/1981  France .
4218113   6/1993  Germany .
800985    9/1958  United Kingdom .

*Primary Examiner*—Robert J. Warden
*Assistant Examiner*—E. Leigh Dawson
*Attorney, Agent, or Firm*—Davis and Bujold

[57] ABSTRACT

The object of the present invention is to recondition cardboard or similar tubes with deformed parts, notably at the ends, whilst avoiding the usual milling techniques and without removing any material. The deformed parts of each tube (1) are recalibrated to their initial thickness by being rolled between pairs of rollers (15, 20), of which at least one is driven in rotation. The tube (1) is then supported only by the rollers. Each internal roller (20) can be mounted on a movable support (18) which brings it into its working position in the tube. Application for the reconditioning of tubes serving as supports for textile yarn reels.

11 Claims, 3 Drawing Sheets

DEVICE FOR RECONDITIONING TUBES, PARTICULARLY CARDBOARD TUBES

The present invention relates to device for reconditioning tubes with deformed parts, particularly cardboard tubes for textile yarn reels; said device comprising a series of treatment stations and conveying means to bring the tubes one after the other to the treatment stations.

In the textile industry, yarn reels are made on winders and the supports used to form the central part of each reel are generally cylindrical cardboard tubes. These tubes are deformed by being crushed, generally concentrated at both ends. These deformations can be caused by the various machines which handle the reels, i.e. the caps which keep the tube on the winder, the gripping instrument which recovers the finished yarn and places it on the yarn supply creel which supplies the weaving or other machine, or they can be due to the storage conditions, etc. After being used, the tubes are therefore deformed and can no longer be used again as they are no longer resistant enough at the ends to be readily handled.

In order to avoid replacing the worn tubes, it is common to recondition them by means of a milling machine which eliminates excessive internal thicknesses (burrs, double folds) generally by means of two milling cutters at either end of the tube.

This reconditioning technique is based on removing material which results in a weakening of the milled parts and the generation of dust which has to be sucked up and filtered. The machine is therefore quite complex and costly. Furthermore, the milled surfaces are not as smooth and resistant as new surfaces and they then deteriorate more rapidly.

It is known that there are other devices designed in particular to remove bumps from metal circular recipients, in particular by means of a rolling process between two rollers pressed against one another. The French publication FR-A-645 966 and the British publication GB-A-800 985 describe such devices. They are individual machines in which the recipient is positioned manually on the rollers.

Under no circumstances could these devices be integrated into an automatic reconditioning line where the position of the rollers has to allow a precise and reliable positioning of the tubes to be reconditioned.

The present invention aims to overcome these drawbacks of the prior art with a device which makes it possible to recondition cardboard or similar tubes without removing any material, therefore without destroying the tubes' surface layers and without generating any waste. Furthermore, one particular object of the invention consists in performing this reconditioning work by means of a simple, inexpensive device.

With this aim in mind, the device according to the invention is primarily characterised in that the treatment stations comprise at least one rolling station which is provided with at least one internal roller and one external roller, one of these rollers being connected to a rotational drive mechanism, and in that the internal roller is mounted so that it rotates freely on a movable support controlled by means used for moving and adjustment purposes, so that the internal roller moves between a working position, where the wall of one of the tubes is pressed between the two rollers, and a withdrawn position where the two rollers are separated from one another.

Rolling the tube's damaged walls results in these walls being recalibrated to their initial thickness, by flattening and incorporating the excessive thicknesses and burrs into this thickness. This rolling can be done easily by means of steel rollers or rolls, one of which is inserted in one end of the tube. In general just one of the two rollers opposite each other has to be driven, which very much simplifies the support and drive mechanisms. As it is mainly the tube ends which are deformed, the rolling is generally restricted to these areas, where it can be carried out with simple means. Both ends of the tube can be rolled simultaneously.

In a preferred embodiment, the device comprises two internal rollers, arranged so that each of them fits into one end of the tube to take up their working position and cooperates with two external rollers, mounted on a common shaft, or with one common external roller extending along the full length of the tube.

According to one particularly advantageous aspect of the device, the tube is supported only by said opposing rollers during the rolling. It is thus possible to simplify the means used to support and convey the tubes in said device, and above all to treat tubes of various diameters without altering the rolling device.

Preferably, the or each external roller is connected to the rotational drive mechanism. The axis of rotation of the or each external roller can be stationary.

According to a first embodiment, the or each movable support is formed by a swivelling lever, one end of which carries the external roller and the other end is coupled to the means used for moving and adjustment purposes.

According to another embodiment, the or each movable support is mounted on a head which also supports the external roller and which is in translational motion parallel to the axis of the tube to be treated, said support moving on said head perpendicular to said axis, and said head comprises means of adjustment to bring the internal roller closer to the external roller.

The means used for conveying may have an incline along which the tubes are moved by gravity and the internal rollers can be arranged to lift up each tube to be treated to keep it away from said incline during the rolling. Depending on the operating speeds, moving the tubes by gravity can be replaced by an indexed feed device.

BRIEF DESCRIPTION OF THE DRAWINGS

The present invention and its advantages will be more fully disclosed in the following description of various embodiments with reference to the attached drawings, in which.

Figure 1:
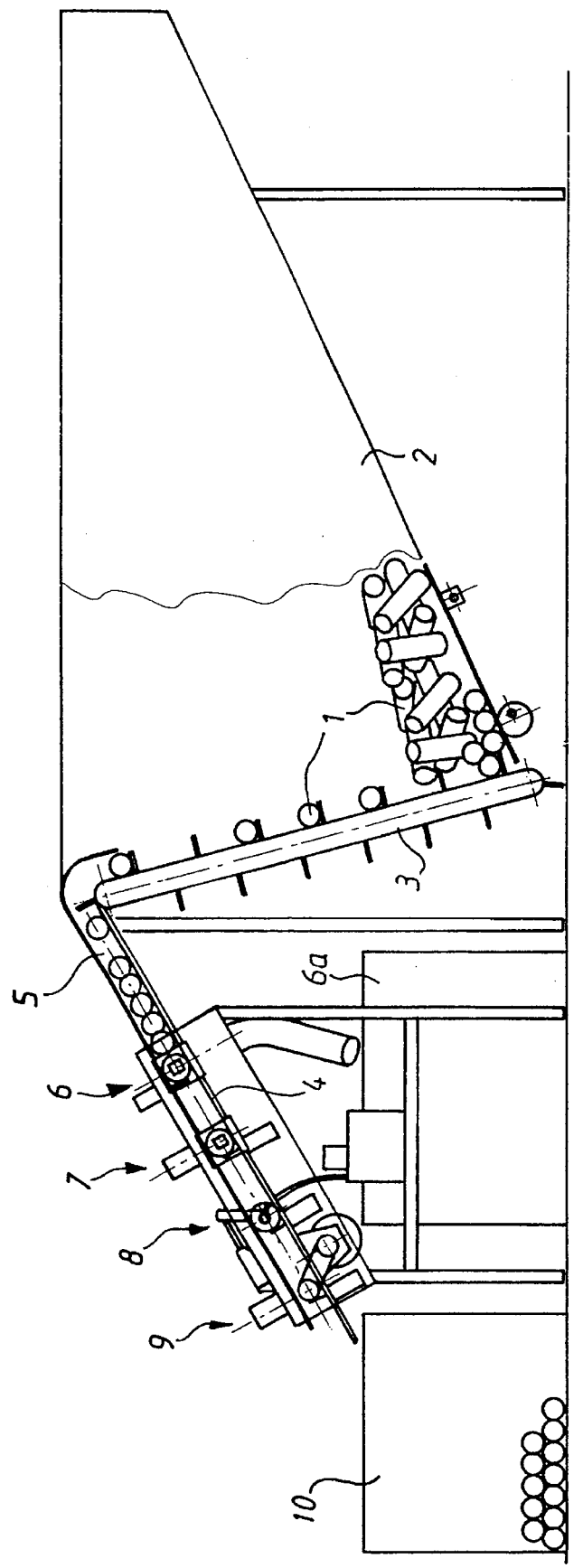
FIG. 1 is a partially cutaway schematic side view of a machine for reconditioning cardboard tubes by the process proposed in the present invention, this machine notably comprising a rolling device, FIG. 2 schematically represents a cross-sectional view of the rolling device's main components, in a position where tubes are being transferred.

The overall structure of the machine shown in FIG. 1 is similar to that of well know machines using the milling technique to recondition cardboard tubes, but by replacing the milling by rolling it is possible in particular to simplify the construction and operation of some parts of the machine, and to above all avoid generating dust. The tubes to be reconditioned are placed in bulk in a receiving hopper 2 where they are picked up one by one by means of an endless chain bucket elevator 3 which deposits them transversely on inclined rails 4 in a conveying chute 5. Passing through the latter by gravity, the tube 1 successively crosses through a control station 6 where any tubes which are beyond salvaging are detected and ejected into a container 6a, by means of an operation whereby the inside diameter of both ends is checked; a rolling station 7 which shall be described in greater detail below; a blotting station 8 where inscriptions such as a barcode on each tube are blotted; and an outlet station 9 where various operations can be performed, e.g. smoothing the ends, final inspection and/or sorting according to the tubes' diameter, if required. The reconditioned tubes coming out of the machine drop into a receiving container 10.

Figure 2:
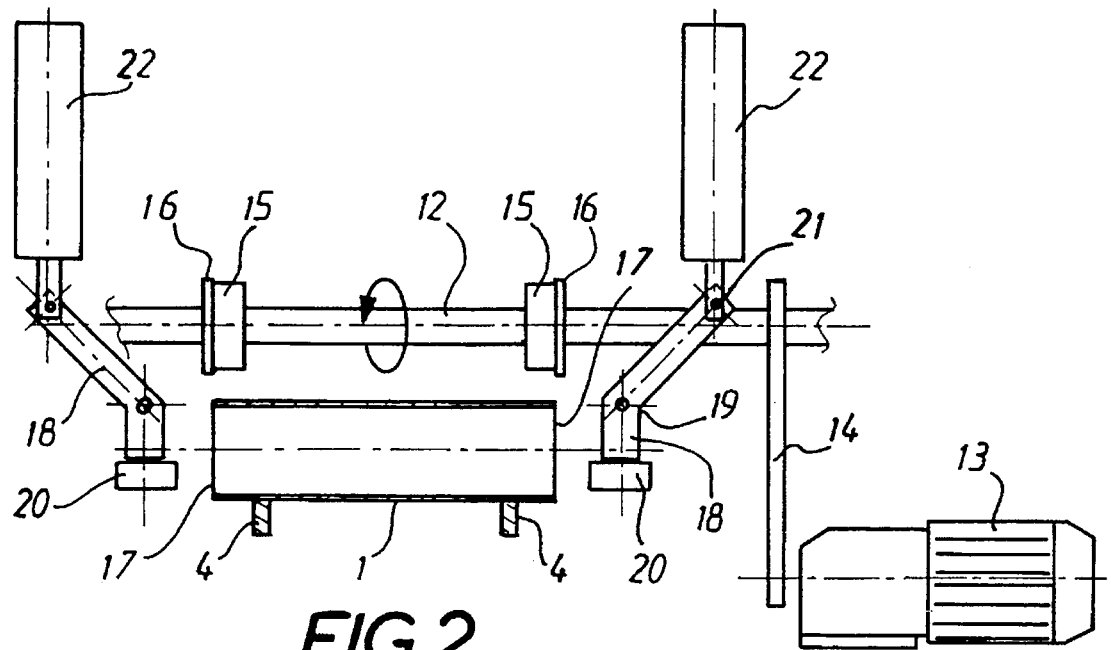
Figure 3:
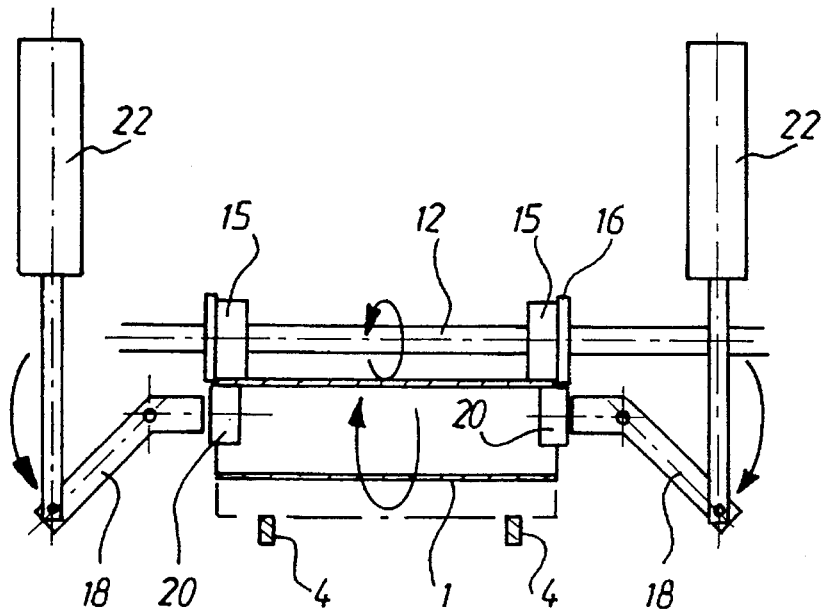
FIG. 3 represents the rolling device in FIG. 2 in its working position.

In its embodiment shown in FIGS. 2 and 3, the rolling device comprises a stationary rotary shaft 12 driven by a back-geared motor set 13 by means of a transmission 14. The shaft 12 is for example located above the tube 1 supported by the rails in the rolling station and it bears two external rolling rollers 15. The axial position of at least one of the rollers on the shaft can be adjusted to the length of the tubes to be treated, so that an outer edge 16 of each roller 15 is placed in front of the corresponding end 17 of the tube 1. However, this outer edge is not essential. Opposite each of these ends there is a lever 18 which rotates about an axis 19 perpendicular to the tube and which has, on its front end, a so-called inside freely rotating roller 20, designed to work inside the tube. The other end of the lever 18 is connected at 21 to a linear actuator 22, such as a hyraulic or pneumatic jack, which controls both the movement of the roller 20 and the force with which it is applied against the wall of the tube in the working position illustrated in FIG. 3. Both actuators 22 do of course operate in synchrony. The axial position of one of the units can be adjusted with that of the corresponding external roller 15 to adapt to the length of the tubes to be treated.

From the position in FIG. 2, where the tube 1 is held by a movable stopper not shown, the actuators 22 make the levers 18 rotate approximately 90°, so that the rollers enter the ends of the tube, lift it up and press it against the external rollers 15 in the position in FIG. 3. The shaft 12 and the rollers can rotate continuously. The ends of the tube's wall are thus rolled between the opposing rollers by rolling on them without sliding, the rollers being driven by friction against the tube. After rolling, the reverse motion of the actuators 22 deposits the tube 1 on the rails 4 and releases the rollers 20, so that the tube rolls by gravity to the next station.

Figure 4:
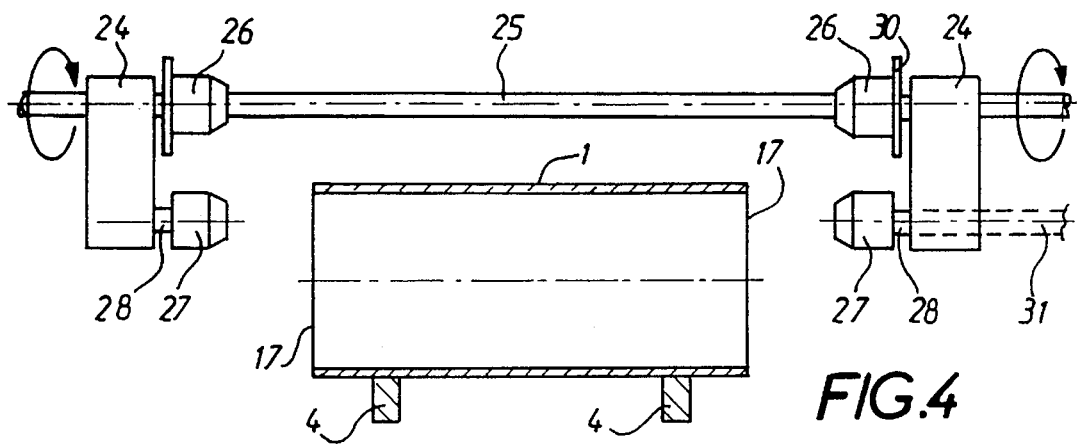
FIGS. 4 and 5 are similar views to those in FIGS. 2 and 3 in another embodiment of the rolling device.
Figure 5:
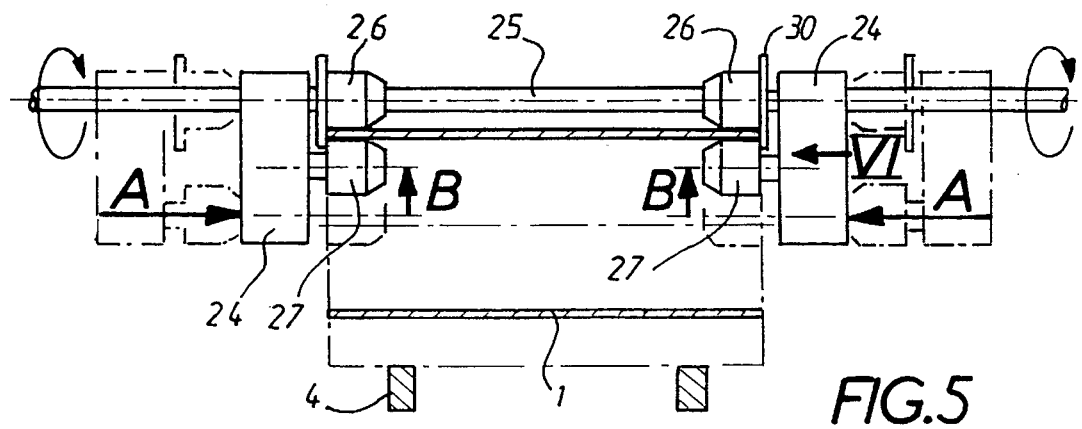
Figure 6:
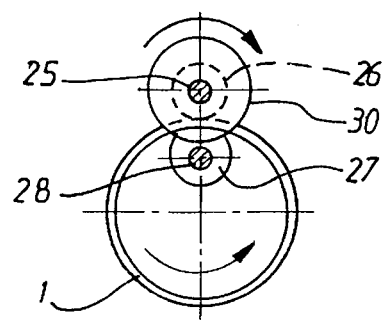
FIG. 6 is a schematic view following the arrow VI in FIG. 5.

In the embodiment illustrated by FIGS. 4 to 6, a mobile rolling head 24 is provided close to each end 17 of the tube 1 which can slide along a continuously rotating drive shaft 25. This head bears an external rolling roller 26 driven in rotation by the shaft 25 by means of grooves or keys. An internal rolling roller 27, rotating freely about an axis parallel to that of the roller 26 and the shaft 25, is borne by a support 28 which is connected to an actuator (not shown) in the head 24, making it possible to vary the distance between the rollers' axes and to press the tube's wall between them.

In the transfer position illustrated in FIG. 4, the two heads 24 are sufficiently far apart to allow the tube to move forward as far as the stopper. The working position in FIG. 5 is reached after two successive movements: one axial movement A of each head 24 until the edge 30 of the external rollers reaches the tube, followed by a radial movement B of each internal roller 27 to lift up the tube and press it between the roller as in the previous example. The reverse movements release the tube after rolling.

With this kind of device, one can imagine perfecting the system to be able to roll any part whatsoever of the tube 1, by means of an axially mobile internal roller, cooperating with an external roller which is also mobile, or with a roller mounted on the shaft 25 and covering the whole length of the tube. This internal roller can be borne by a shaft 31 (FIG. 4) capable of sliding axially to cross the inside of the tube as far as the opposing roller 27 in order to rest in the latter.

The present invention is not restricted to the example of embodiment described above, and can be widened to include any modifications or alternatives which are obvious for the expert.

We claim:

1. A device, for reconditioning tubes with deformed parts, comprising: a series of treatment stations and conveying means to convey the tubes one after the other to the treatment stations, wherein the treatment stations comprise at least one rolling station (7) comprising at least one internal roller (20, 27) and at least one external roller (15, 26), the external roller being connected to a rotational drive mechanism (12–14) and the internal roller being rotatably mounted to a movable support (18,28) for free rotation on the movable support (18, 28);

wherein an actuator (22) is connected to the movable support (18, 28) for moving the movable support and thereby moving the internal roller (20, 27) between:
   (i) a withdrawn position where the internal roller (20, 27) is separated from the external roller (15, 26) and does not engage the tubes on the conveying means (4); and
   (ii) a working position where the internal roller (20, 27) is inserted in an end of one of the tubes, whereby the one of the tubes is lifted and supported by the internal roller (20, 27) above the conveying means (4) during rolling, and a wall of the one of the tubes is pressed between the internal roller (20, 27) and the external roller (15, 26).

2. Device as claimed in claim 1, wherein the at least one external roller comprises one of a) two external rollers (15, 26) mounted on a common shaft (12, 25) and b) one common external roller extending along the full length of the tube.

3. Device as claimed in claim 2, wherein one of the common external roller and each of the two external rollers (15, 26) is connected to the rotational drive mechanism.

4. Device as claimed in claim 2, wherein the movable support comprises a pivoting lever (18), one end of the lever (18) bears the internal roller (20) and the other end of the lever is connected to the actuator (22).

5. Device as claimed in claim 4, wherein there are two said pivoting levers (18), each pivoting lever (18) bears a said internal roller on one end and is connected to the actuator (22) at the other end, the pivoting levers (18) are arranged on opposite ends of the tubes on the conveying means, whereby upon movement of the pivoting levers (22) the internal rollers (20) are inserted one into each end of one of the tubes on the conveying means for lifting, supporting, and pressing the one of the tubes against the at least one external roller during rolling.

6. Device as claimed in claim 2, wherein the movable support (28) is mounted on a head (24) which also supports the external roller (26), which head (24) is movable in translational motion parallel to the axes of the tubes on the conveying means inserting the internal roller (27) in an end of one of the tubes;

the movable support (28) is movable on the head (24) perpendicularly to said axis; and said head (24) comprises adjustment means to move the movable support toward said axis for, when the internal roller is inserted in an end of one of the tubes on the conveying means, moving the internal roller (27) closer to the external roller for lifting and supporting the one of the tubes above the conveying means (4) and pressing the wall of the one of the tubes between the internal roller (20, 27) and the external roller (15, 26).

7. Device as claimed in claim 6, wherein there are two said heads (24), each head (24) bears a said movable support, a said adjustment means and a said external roller (26), the heads (24) are arranged on opposite ends of the tubes on the conveying means, whereby upon movement of the movable supports the internal rollers (27) are inserted one into each end of one of the tubes on the conveying means for lifting, supporting, and pressing the one of the tubes against the at least one external roller during rolling.

8. Device as claimed in claim 1, wherein the axis of rotation of the at least one external roller (15, 26) is stationary.

9. Device as claimed in claim 1, wherein, the conveying means to the rolling station (7) comprises an incline (4) along which the tubes (1) move by gravity, and the at least one internal roller (20, 27) is arranged to, when traveling from the withdrawn position to the working position, lift up each tube to be treated to support each tube to be treated above the incline during the rolling.

10. Device as claimed in claim 1, wherein the movable support (18, 28) comprises a pivoting lever (18), one end of the lever (18) bears the internal roller (20) and the other end of the lever is connected to the actuator (22).

11. Device as claimed in claim 1, wherein the movable support (28) is mounted on a head (24) which also supports the external roller (26), which head (24) is movable in translational motion parallel to the axes of the tubes on the conveying means for inserting the internal roller (27) in an end of one of the tubes;

the movable support (28) is movable on the head (24) perpendicularly to said axis; and said head (24) also supports adjustment means to move the movable support toward said axis for, when the internal roller is inserted in an end of one of the tubes on the conveying means, moving the internal roller (27) closer to the external roller for lifting and supporting the one of the tubes above the conveying means (4) and pressing the wall of the one of the tubes between the internal roller (20, 27) and the external roller (15, 26).

* * * * *